United States Patent
Scalzi

(10) Patent No.: US 8,766,030 B2
(45) Date of Patent: Jul. 1, 2014

(54) UTILIZATION OF FERRIC AMMONIUM CITRATE FOR IN SITU REMEDIATION OF CHLORINATED SOLVENTS

(75) Inventor: Michael Scalzi, Pipersville, PA (US)

(73) Assignee: Innovative Environmental Technologies, Inc., Pipersville, PA (US)

( * ) Notice: Subject to any disclaimer, the term of this patent is extended or adjusted under 35 U.S.C. 154(b) by 154 days.

(21) Appl. No.: 13/557,937

(22) Filed: Jul. 25, 2012

(65) Prior Publication Data

US 2014/0030797 A1   Jan. 30, 2014

(51) Int. Cl.
*A62D 3/34* (2007.01)

(52) U.S. Cl.
USPC ........... 588/316; 588/318; 588/406; 588/415; 588/901

(58) Field of Classification Search
CPC ............. A62D 3/30; A62D 3/34; A62D 3/36; A62D 101/04; A62D 101/22; A62D 101/49
USPC .................. 588/316, 313, 318, 406, 415, 901
See application file for complete search history.

(56) References Cited

U.S. PATENT DOCUMENTS

| | | | |
|---|---|---|---|
| 3,768,988 A | 10/1973 | Meyers | |
| 4,803,047 A * | 2/1989 | Pluim, Jr. | 422/5 |
| 5,575,926 A | 11/1996 | Haitko et al. | |
| 6,207,073 B1 | 3/2001 | Wolfe et al. | |
| 6,228,247 B1 | 5/2001 | Griffith et al. | |
| 6,797,171 B2 | 9/2004 | Bartlett | |
| 7,507,345 B2 | 3/2009 | Zhang | |
| 7,846,408 B1 | 12/2010 | Cox, Jr. | |
| 8,097,559 B2 | 1/2012 | Noland et al. | |
| 8,105,808 B2 | 1/2012 | Lorah et al. | |

OTHER PUBLICATIONS

Cundy, Andrew B. et al., "Use of Iron-based Technologies in Contaminated Land and Groundwater Remediation: A Review." Elsevier 400 (2008): 42-51.

Rickard, David et al., "Chemistry of Iron Sulfides." Chem. Rev. 107 (2007): 514-62.

\* cited by examiner

*Primary Examiner* — Edward Johnson
(74) *Attorney, Agent, or Firm* — IP Works, PLLC

(57) ABSTRACT

Accelerated dechlorination of soil and water contaminated with chlorinated solvents in situ is achieved by delivering ferric ammonium citrate into the soils and/or water. The induction of ferric ammonium citrate into sulfate-rich reducing conditions initiates a combined abiotic and biotic mechanism for the dechlorination of subsurface contaminants. Initial and rapid removal of chlorinated solvents is achieved by way of reductive transformation, a mechanism utilizing the creation of an iron-bound soil mineral (pyrite) followed by stimulating conditions for enhanced biological natural attenuation.

24 Claims, No Drawings

UTILIZATION OF FERRIC AMMONIUM CITRATE FOR IN SITU REMEDIATION OF CHLORINATED SOLVENTS

FIELD OF THE INVENTION

The present application relates to the mediation of subsurface soil and ground water contamination. More specifically, ferric ammonium citrate ($[Fe^{+3}]x[NH4+]y[C6H5O7^{-3}]x+y/3$) is introduced as a remedial compound for the dechlorination of soil and ground water.

The induction of ferric ammonium citrate into sulfate-rich reducing conditions to initiate a combined abiotic and biotic mechanism for the dechlorination of subsurface contaminants is described herein. Initial and rapid removal of chlorinated solvents is achieved by way of reductive transformation, a mechanism utilizing the creation of an iron-bound soil mineral (pyrite) followed by stimulating conditions for enhanced biological natural attenuation.

BACKGROUND OF THE INVENTION

Chlorinated solvents are the most common class of ground water contaminants detected in hazardous waste sites in the U.S. The Agency for Toxic Substances and Disease Registry (ATSDR) has repeatedly listed chlorinated solvents and their degradation products as the most frequently detected group of priority contaminants. Due to the unique characteristics of each site, the remediation of these compounds is often met with a variety of obstacles inherent to both the target organics and the environmental conditions.

The use of naturally occurring microbes to facilitate the degradation of target organics is well known in the art. Biotic degradation pathways use a series of slow sequential reactions to convert chlorinated solvents into harmless byproducts via electron exchange. Natural attenuation of these contaminants is enhanced in the presence of an electron donor, food source, electron acceptor, and/or substrate for the microbes. Previously, this enhancement has been sought using a variety of natural and chemical additions to contaminated soil and/or ground water, such as kelp and zero-valent iron. However, some environmental conditions limit the effectiveness of these materials, and thus limit the extent of decontamination that may occur. Additionally, biotic dechlorination is often associated with the formation of harmful daughter products (for example, cis- and trans-dichloroethene and vinyl chloride), and material that both reduces the formation of these byproducts and overcomes environmental limitations is needed.

Traditionally, sulfate-bearing ground waters were thought not amiable for reductive dechlorination. The reduction of sulfate to sulfide, a compound toxic to microbes, inhibits biological activity and thus prevents natural attenuation. In order to sustain natural attenuation, sulfide concentration must be reduced. The current state of the art involves attempting to minimize sulfide concentration ex situ or by the introduction of sulfate reducing microbes. As such, there is a need for a material which will diminish the presence of sulfide in situ without the addition of new microbes.

SUMMARY OF THE INVENTION

To overcome the forementioned problems, the present invention utilizes ferric ammonium citrate as a remedial compound. The introduction of ferric ammonium citrate in the subsurface will enhance the degradation of chlorinated volatile organic compounds (CVOCs), such as perchloroethylene (PCE) and trichloroethylene (TCE), using both abiotic and biotic pathways. Ferric ammonium citrate is particularly suited for dehalogenation of solvents including, but not limited to, tetrachloroethane, tetrachloroethene, trichloroethane, trichloroethene, carbon tetrachloride and their anaerobic daughter products. The present invention achieves accelerated dechlorination of soil and ground water contaminated with chlorinated solvents by fostering both an abiotic pathway and a biotic pathway. In brief, the abiotic pathway stimulates the biological mineralization of contaminants via a reaction of sulfate already present in the soil or ground water with iron introduced as ferric ammonium citrate to produce pyrite. The biotic pathway follows naturally as dechlorinating microbes are already present in the soil, and their performance is enhanced in several ways, which will be delineated herein, by the presence of ferric ammonium citrate. The abiotic process is generally short lived and it is therefore necessary, though not yet known in the art, to compliment this process with the biotic one. Ferric ammonium citrate is uniquely suited to accomplish this task.

Ferric ammonium citrate is a water-soluble complex salt of undetermined structure, commercially available as a powder, granule, or crystal. The compound is a transparent solid, either reddish-brown or green in color depending on its chemical composition. Brown ferric ammonium citrate contains approximately 16.5-18.5% Fe, 9% NH3, and 65% hydrated citric acid, whereas green ferric ammonium citrate contains approximately 14.5-16% Fe, 7.5% NH3, and 75% hydrated citric acid. Ferric ammonium citrate readily reduces in light and is most commonly known for its use in cyanotype printing, water purification, and as an acidity regulator in food additives. As a remedial compound, ferric ammonium citrate has a variety of chemical properties that are favorable to enhancing the degradation of chlorinated solvents.

Ferric ammonium citrate offers a unique means to apportion the degradation of CVOCs chemically and biologically. The abiotic approach conceived utilizes the interaction between naturally occurring sulfate (the assumed environmental conditions) and ferric iron introduced through ferric ammonium citrate. Ferric iron (Fe+3) can reduce to ferrous iron (Fe+2); readily supplying electrons to exchange and react with sulfide. Together, sulfide and iron form pyrite, an iron bearing soil mineral with a favorable reductive capacity. This process has a two-fold benefit. First, pyrite itself facilitates the removal of target organics through the formation of a pyrite suspension. Second, the synthesis of pyrite in lieu of sulfide combats the toxic effects of sulfide on dechlorinating bacteria, thus enhancing the biotic aspect of reductive dechlorination.

Pyrite possesses a finite number of reactive sites for target organic adsorption that are directly proportional to both its reductive capacity and the rate of decay of the target organics. Because sulfate is consumed during the formation of pyrite, the competition between sulfate and the target organics for these reactive sites is minimized. Once the reductive capacity of pyrite is met, the bound chlorinated solvents precipitate out, removing the contaminants rapidly and without the production of daughter products. Despite the substantial removal of contaminants, this abiotic reaction is often short lived and requires a slower reaction to remove remaining contaminants through biotic dechlorination.

Addition of ferric ammonium citrate stimulates conditions for biologically mediated natural attenuation, achieving a prolonged biotic dechlorination reaction. This two-part process integrates the actions of dechlorinating bacteria and the chemical reduction of chlorinated solvents by utilizing their byproducts as an electron acceptor for microbial metabolism.

As a result, a sequential dechlorination of contaminants (ex. chlorinated ethylenes) ensues, replacing contaminants with a harmless byproduct (ex. ethylene). Ferric ammonium citrate offers all of the essential components necessary to achieve biotic degradation; ammonium and citrate respectively.

Using ferric ammonium citrate as a remedial compound provides an electron exchange medium for microbial metabolism and hydrogen gas production (donor). Deliverance of ferric ammonium citrate will mediate the reductive dechlorination of chlorinated solvents, like PCE and TCE, completely to ethene and ethane. Yet another advantage lies in the rate-limiting step from which vinyl chloride converts to ethylene. It has been found that this step is accelerated in the presence of electron carriers; in this case iron and citric acid.

Citrate is one component responsible for stimulating the conditions for microbial growth and initiating the process of biological reductive dechlorination. Citric acid has an essential role in maintaining the biochemistry of microbial metabolism during the Krebs cycle and is therefore a key additive for the proliferation of dechlorinating microbes. Additionally, citric acid readily loses its protons in acidic conditions. Thus, citrate acts as a proton donor for the microbes to proceed in a favorable exchange of electrons. This exchange promotes the degradation of the targeted organic contaminants, eventually resulting in the replacement of chlorine atoms with hydrogen atoms via a biotic degradation pathway (first order elimination reaction).

Ammonium aids the degradation pathway by supplying essential nutrients to fuel microbial anaerobic processes. Additionally, ammonium acts as a buffer, stabilizing pH conditions and counteracting acids produced by way of anaerobic dechlorination. With an ample supply of nutrients and a sustained source of electrons for microbial metabolism, ferric ammonium citrate can achieve a prolonged biotic degradation of remaining contaminants after pyrite suspension.

Utilizing ferric ammonium citrate will induce abiotic attenuation, an unprecedented remedial process not yet considered an integral part of remediation efforts. By creating iron-rich mineralogy in naturally reducing conditions, chlorinated solvents can be degraded without the sequential production of daughter products. This unique combination using both an abiotic degradation pathway via pyrite production followed by a slower biotic reaction pathway will promote the effective and rapid remediation of compounds such as tetrachloroethane, tetrachloroethene, trichloroethane, trichloroethene, carbon tetrachloride and their anaerobic daughter products.

An interdisciplinary approach that integrates hydrology, geology, chemistry, microbiology, and economics has been conceived and described herein to harness recent advances in the understanding of biodegradation processes. Methods for remediating residual source areas and cutting off dissolved plumes will be utilized by emplacing solid-phase or aqueous-phase treatment agents into a variety of soil types and subsurface volumes using conventional methods known in the art.

One embodiment of this invention involves delivering ferric ammonium citrate into induced fractures of low permeability sulfate containing soils to maintain nutrient-rich anaerobic conditions that will promote and accelerate the long-term bioremediation of chlorinated solvents. Individual use of ferric ammonium citrate directly promotes both biotic and abiotic processes responsible for the remediation of contaminated sites. The injection of said material allows for an initial and rapid removal followed by a prolonged period of absorption that enhances and extends the anaerobic remedial process.

One method of the aforementioned injection is by way of temporary rods or permanent wells. Alternately, a simple single step method of employing the invention is injecting a solution of ferric ammonium citrate into the subsurface using a pump.

The foregoing refers only to the principles of the invention. It is to be understood that the invention is not to be limited to the exact construction, application, or operation described and illustrated herein. Ergo, the invention is not limited in its application to the details of construction and/or the arrangements of the components set forth in what follows. It is to be understood that the phraseology and terminology employed throughout should not be regarded as limiting, but as a means of describing the invention; upon which it is important that claims be regarded as equivalent construction and/or application within the scope of the present invention. Those skilled in the art will recognize that the present invention is capable of other embodiments and of being carried out or practiced in a variety of different ways. Accordingly, it is understood that modifications and/or equivalents falling within the scope of the invention may not be utilized as a basis for other methods, structures, or systems for carrying out purposes of the present invention.

DESCRIPTION OF THE PREFERRED EMBODIMENT

One embodiment of the present invention is carried out in the following steps:

Step 1: Subsurface Pathway Development

A gas is delivered to the subsurface as follows; injection points are advanced via traditional direct push technology using injection rods or permanently installed injection wells. The gas is introduced at approximately 175 psi such that delivery pathways and voids are established. Pathway development is verified by observing a substantial pressure drop at the surface monitoring point. The gas is used so as not to introduce oxygen into an environment targeted for anaerobic processes.

Step 2: Ferric Ammonium Citrate

A solution of ferric ammonium citrate is prepared for injection. Once in solution, the soluble ferric ammonium citrate will be injected into the subsurface using a pump.

Next, a solution of ferric ammonium citrate is immediately injected into the subsurface fractures and voids that were developed during the gas injection step. Ferric ammonium citrate provides sources of electron exchange, hydrogen donors, and nutrients that interact favorably in sulfate rich reducing conditions for pyrite initiated abiotic reductive transformation followed by favorable anaerobic conditions for the biodegradation of the CVOCs.

Step 3: Post Liquid Injection-Gas Injection

The injection lines are cleared of liquids by a second gas injection and all injectants are forced into the created formation and upward into the vadose zone. Once the injection cycle is complete, the injection point is temporarily capped to allow for the pressurized subsurface to accept the injectants. Once back-pressure diminishes, the injection rods are extracted. Injection boring locations are then sealed with bentonite or sand to prevent short-circuiting from adjacent injection locations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for accelerated dechlorination of soils and/or water in situ via at least one pathway of an abiotic pathway and a biotic pathway, said method comprising the step of delivering a predetermined amount of ferric ammonium citrate into the soils and/or water in situ to stimulate reaction of said ferric ammonium citrate with the soils and/or water.

2. The method of claim 1, wherein said ferric ammonium citrate reacts with sulfate in the soils and/or water to form pyrite.

3. The method of claim 2, wherein target organic compounds are precipitated as a pyrite suspension.

4. The method of claim 2, wherein pyrite reduces the accumulation of harmful byproducts associated with dechlorination.

5. The method of claim 2, wherein pyrite acts as a reducing agent.

6. The method of claim 2, wherein pyrite formation lessens the amount of sulfide formed.

7. The method of claim 1, wherein said ferric ammonium citrate facilitates abiotic attenuation of contaminants.

8. The method of claim 1, wherein said ferric ammonium citrate is introduced as a means to promote electron transfer.

9. The method of claim 8, wherein citrate is used as a reducing agent.

10. The method of claim 8, wherein iron is used as an oxidizing agent.

11. The method of claim 8, wherein ammonium is used as a pH buffer.

12. The method of claim 1, wherein said ferric ammonium citrate is introduced via injection into soils and/or water.

13. The method of claim 12, wherein said ferric ammonium citrate is injected in such a manner as to ensure its dispersion into the subsurface.

14. The method of claim 12, wherein said ferric ammonium citrate is under pressure.

15. The method of claim 14, wherein the pressure is achieved via compressed gas or liquid pumping systems.

16. The method of claim 14, wherein injection is achieved via temporary rods or permanent wells.

17. The method of claim 1, wherein said ferric ammonium citrate is utilized to stimulate conditions for biotic attenuation of chlorinated compounds.

18. The method of claim 17, wherein citrate is used to stimulate the Krebs cycle in microbes.

19. The method of claim 17, wherein ammonium is used as a nitrogen source.

20. The method of claim 1, wherein said ferric ammonium citrate is utilized in conjunction with other materials for reductive dechlorination.

21. The method of claim 20, wherein the delivered materials are introduced as a mixture.

22. The method of claim 20, wherein the delivered materials are introduced into the compressed gas stream or pumped as a liquid.

23. The method of claim 20, wherein the delivered materials are introduced as a suspension.

24. The method of claim 1, wherein said ferric ammonium citrate is introduced as a soluble salt in a form selected from the group consisting of a powder, granule, crystal, and any combination thereof.

* * * * *